W. T. SHERER.
CANISTERS.
No. 7,150. Reissued May 30, 1876.
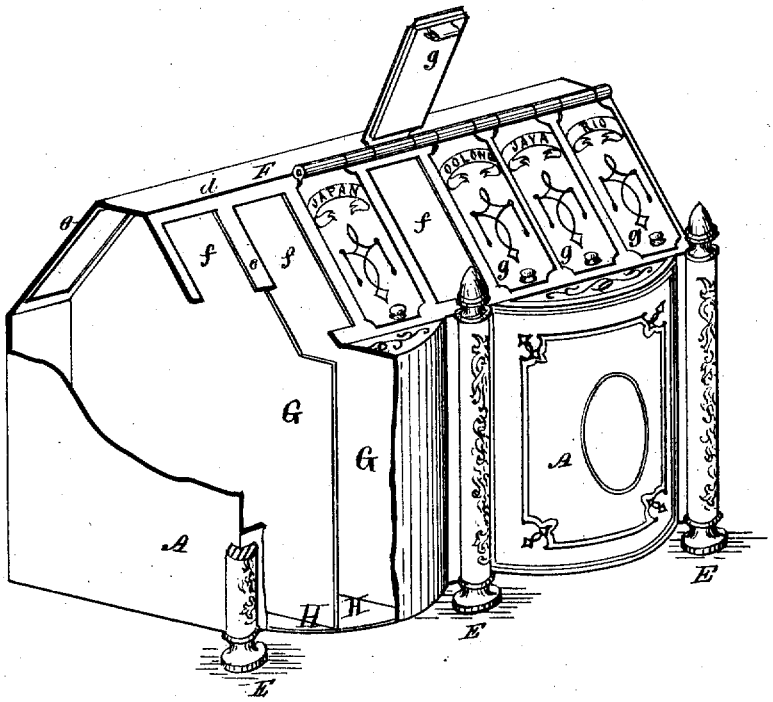
WITNESSES:
Julius Wilcke
C. H. Sherburne,
INVENTOR:
William T. Sherer
By Gridley & Sherburne
Attys
N. PETERS, PHOTO-LITHOGRAPHER, WASHINGTON, D. C.

UNITED STATES PATENT OFFICE.

WILLIAM T. SHERER, OF CHICAGO, ILLINOIS.

IMPROVEMENT IN CANISTERS.

Specification forming part of Letters Patent No. 161,829, dated April 6, 1875; reissue No. 7,150, dated May 30, 1876; application filed March 27, 1876.

*To all whom it may concern:*

Be it known that I, WILLIAM T. SHERER, of Chicago, in the county of Cook and State of Illinois, have invented certain new and useful Improvements in Tea-Caddies; and I do hereby declare the following to be a full, clear, and exact description thereof, which will enable others skilled in the art to which my invention appertains to make and use the same, in which—

The figure represents a perspective view of a tea-caddy embodying my said invention, a portion of the case being broken away, showing the interior.

The object of my invention is to enable tea, coffee, and other like articles of merchandise sold in small quantities, to be stored in a convenient, compact, easily accessible, and attractive form upon the counter of a store; and to that end it consists in a tea-caddy provided with a series of partitions, forming parallel compartments therein, and with lids arranged to cover said compartments, as hereinafter more fully described.

In the drawing, A represents the case, the plan of which is a general rectangular shape, except that the front wall is formed into two ornamental panels, which swell outward, and are separated and bordered by three half-round columns, E, extending from the base upward. The upper side or top of the case is inclosed by a cover, F, usually consisting of a narrow central section, *d*, and two side sections, *e e*, which incline outward and downward from the edges of said section *d* to the upper edge of the front and back walls of the case. The interior of the case is provided with a series of parallel partitions, G, extending from front to rear and from top to bottom, forming a series of separate compartments, H, into which the different articles of merchandise, as may be desired, are placed for sale. One of the sections *e e* is provided with openings *f*, each communicating with the compartment directly beneath it, and with a series of lids, *g*, hinged to section *d*, and adapted to close the respective openings, or to be raised separately therefrom, so as to uncover the compartments over which they are located, respectively.

The device thus constructed is used as follows: Each cover, or the portion corresponding thereto, has painted or otherwise affixed to its outer side the name of the article to be contained within the compartment beneath it. The compartments are then filled as aforesaid, and the caddy placed upon the counter.

It is intended that the exterior of the case shall be ornamented, so as to cause it to present a neat and tasteful appearance.

Having thus described my invention, what I claim as new, and desire to secure by Letters Patent, is—

The tea-caddy consisting of the case A, provided with partitions G, forming a series of parallel compartments, H, provided with lids *g g*, substantially as specified.

WILLIAM T. SHERER.

Witnesses:
N. H. SHERBURNE,
N. C. GRIDLEY.